(12) United States Patent
Murata

(10) Patent No.: US 6,247,081 B1
(45) Date of Patent: Jun. 12, 2001

(54) METHOD AND APPARATUS FOR INSTALLING DRIVERS WITHOUT REQUIRING SYSTEM RE-BOOT

(75) Inventor: Richard Y. Murata, San Antonio, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/026,162

(22) Filed: Feb. 19, 1998

(51) Int. Cl.$^7$ .................................................. G06F 13/00
(52) U.S. Cl. ............................................................ 710/104
(58) Field of Search ............................................. 710/104

(56) References Cited

U.S. PATENT DOCUMENTS

| | | | | |
|---|---|---|---|---|
| 5,519,851 | * | 5/1996 | Bender et al. | 710/102 |
| 5,572,528 | * | 11/1996 | Shuen | 370/402 |
| 5,590,292 | * | 12/1996 | Wooten et al. | 710/5 |
| 5,652,832 | * | 7/1997 | Kane et al. | 714/2 |
| 5,659,685 | * | 8/1997 | Williams et al. | 709/220 |
| 5,784,576 | * | 7/1998 | Guthrie et al. | 710/103 |
| 5,797,031 | * | 8/1998 | Shapiro et al. | 710/8 |
| 5,884,086 | * | 3/1999 | Amoni et al. | 713/300 |
| 5,922,060 | * | 7/1999 | Goodrum | 710/103 |
| 5,930,496 | * | 7/1999 | MacLaren et al. | 703/23 |
| 5,935,228 | * | 8/1999 | Shinomura | 710/102 |
| 5,941,965 | * | 8/1999 | Moroz et al. | 710/101 |
| 5,943,482 | * | 8/1999 | Culley et al. | 710/103 |
| 5,949,979 | * | 9/1999 | Snow et al. | 710/103 |
| 5,974,473 | * | 10/1999 | Leavitt et al. | 710/8 |

OTHER PUBLICATIONS

G. Hoffman, et al., IEEE 1394: A Ubiquitous Bus, Compcon '95, Technologies for the Information Superhighway, Digest of Papers, 334–38 (Mar./1995).*
B. Porooshani, PCMCIA Card Developments, Conf. Record of WESCON'95, Microelectronics Communications Technology Producing Quality Products Mobile and Portable Power Emerging Technologies, 145–47 (Nov./1995).*
USB Developers Conference Report, [online] Sep. 1995 [retrieved on 2000–04–05]. Retrieved from the Internet <URL: http://www.usb.org/developers/presentations/index.html>.*
Van Wolverton, Running MS–DOS 6.0 490–91 (1993).*
Microsoft Press, Computer Dictionary 181, 216, 244, 357, 370, 415, 487 (1997).*
Microsoft Press, Computer Dictionary 182, 253, 1997.*
Baker, Art, "The Windows NT Device Driver Book—A Guide For Programmers," cover and pp. 409–413, copyright 1997.

* cited by examiner

Primary Examiner—Mark R. Powell
Assistant Examiner—Michael Pender
(74) Attorney, Agent, or Firm—Blakely Sokoloff Taylor & Zafman LLP

(57) ABSTRACT

A method and apparatus for installing device drivers without requiring system re-boot includes installing a driver corresponding to a device into an operating system of a hardware system, wherein the operating system includes a multi-layered driver architecture, including identifying to the operating system at least one other driver to which the driver is to be bound. The driver is then started without re-booting the hardware system.

21 Claims, 7 Drawing Sheets

METHOD AND APPARATUS FOR INSTALLING DRIVERS WITHOUT REQUIRING SYSTEM RE-BOOT

BACKGROUND OF THE INVENTION

1. Field of the Invention

The present invention pertains to computer systems and hardware/software installation. More particularly, this invention relates to installing drivers without re-booting the computer system.

2. Background

Computer systems are increasingly becoming commonplace in homes and businesses throughout the world. A wide range of computer systems are commercially available, encompassing a wide range of features and system configuration options. Numerous devices can be either included in a computer system as originally configured or added on at a later time. Examples of such devices include network adapters, audio and/or video recording and playback devices, mass storage devices (including conventional hard disk drives, floppy disk drives, CD-ROM drives, etc.), scanners, printers, etc.

Adding additional devices to a computer system is often a time-consuming and difficult task from which many users shy away. Adding such additional devices typically requires execution of a setup or installation program which provides one or more device drivers to the system. The drivers indicate to the system how to communicate with the new device. Upon completion of the setup program, the system must be re-started or re-booted before the system is able to use the new driver(s) to communicate with the newly installed device. This setup process can become time consuming and frustrating for the user, particularly in situations where the process must be repeated and the system re-started multiple times. These problems are amplified by the long period of time required by many modern operating systems to boot. Thus, it would be beneficial to provide an improved way to add drivers to a computer system.

Thus, a need exists for improved driver installation in a computer system.

SUMMARY OF THE INVENTION

A method and apparatus for installing drivers without requiring system re-boot is described herein. The method includes the steps of installing a driver corresponding to a device into an operating system of a hardware system, wherein the operating system includes a multi-layered driver architecture, including identifying to the operating system at least one other driver to which the driver is to be bound. Then, the driver is started without re-booting the hardware system.

According to one embodiment of the present invention, the method further includes copying the driver and a corresponding information file from an installation source, wherein the information file includes one or more indicators of the at least one other driver to which the driver is to be bound, and subsequently informing the operating system of the information file. The driver is then added to the operating system.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
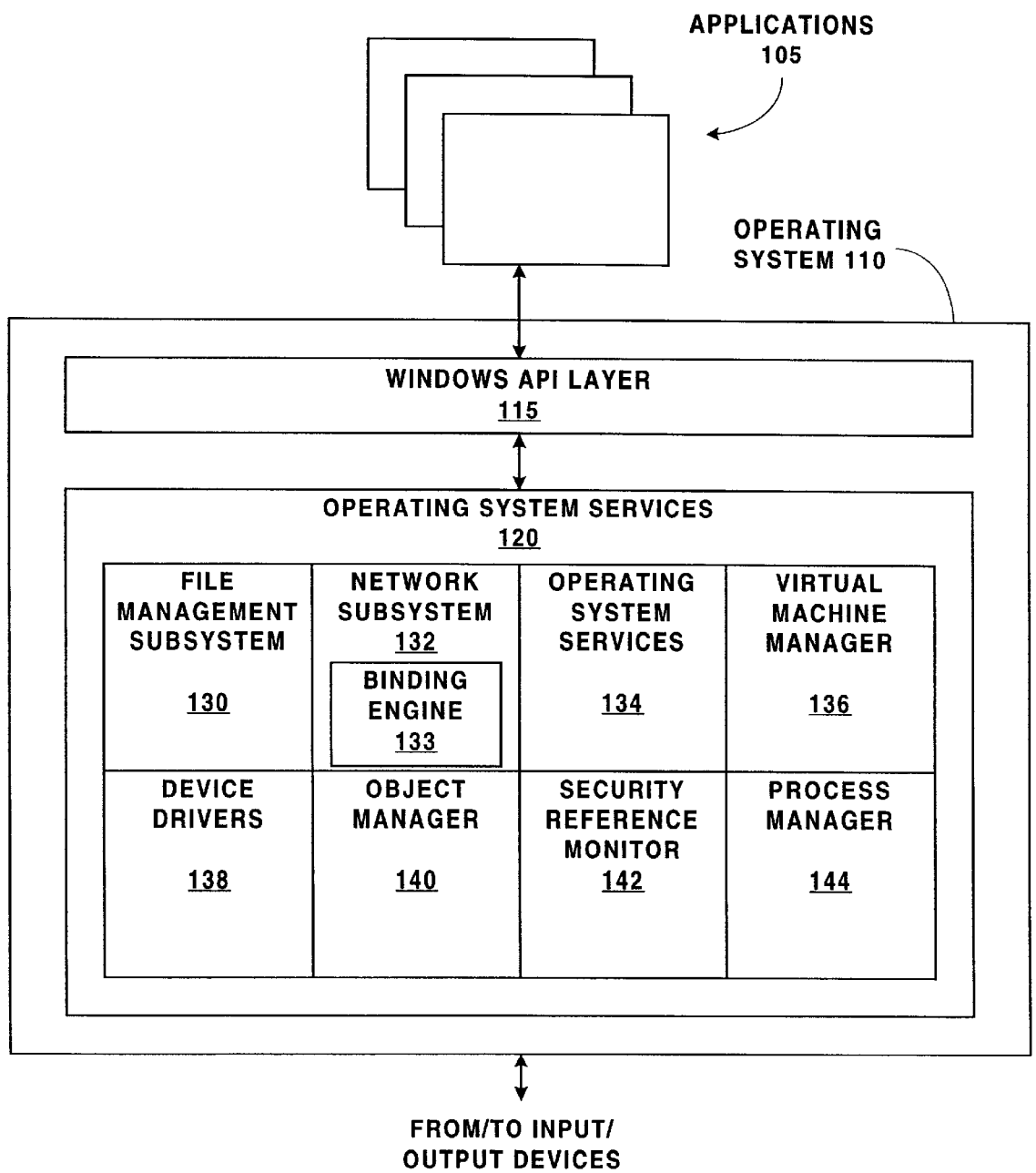
FIG. 1 is a block diagram illustrating the software architecture of a computer system such as may be used with one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

FIG. 1 is a block diagram illustrating the software architecture of a computer system such as may be used with one embodiment of the present invention. A system 100 is illustrated including multiple applications 105 and an operating system 110. The applications 105 include any of a wide variety of conventional application programs, including word processors, spreadsheets, other business applications, games, educational applications, reference material applications, etc. The applications 105 are executed by and run "on top" of the operating system 110.

According to one implementation, the operating system 110 is the Windows NT™ v4.0 operating system available from Microsoft Corporation of Redmond, Washington. However, it is to be appreciated that the present invention may be used with other conventional operating systems, such as other versions of Microsoft Windows (for example, other versions of Windows NT™, Windows 95™, Windows 3.0™, or Windows 3.1™), OS/2, available from International Business Machines Corporation of Armonk, N.Y., the Apple Macintosh Operating System, available from Apple Computer Incorporated of Cupertino, Calif., the NeXT-STEP® operating system available from Apple Computer Incorporated, or the UNIX operating system, available from Santa Cruz Operations of Santa Cruz, Calif.

In the illustrated embodiment, the operating system 110 includes a Windows application programming interface (API) layer 115 and operating system services 120. The applications 105 interface with the operating system services 120 via the windows API layer 115. Transfers of data between the applications 105 and external input/output devices are controlled by the operating system services 120.

Any of a wide variety of devices can be coupled to the computer system. As used herein, a device refers to a physical component which can be added to or coupled to a computer system, either at the time of original manufacture and/or assembly of the system or afterwards. Examples of such devices include network adapter boards or cards, multimedia boards or cards, graphics adapters, modems, storage apparatus (such as hard disk drives, CD-ROMS, Digital Versatile Disk (DVD) drives), scanners, cursor control apparatus, printers, etc.

Device drivers specific to each particular device are included in or added to the system to allow the operating system 110 to transfer data to/from and communicate with such devices. Depending on the specific operating system, an additional "information" file, such as a ".inf" file in the Windows NT™ operating system, may also accompany a device driver. The information files indicate to the operating system how, during installation and subsequent execution of the operating system, the corresponding device driver(s) should be bound to other drivers within the operating system. The device drivers and corresponding information files are typically added to a computer system by an installation or setup program executed when the device is installed. Device drivers and corresponding information files are well known to those skilled in the art and thus will not be discussed further except as they pertain to the present invention.

As illustrated, the operating system services 120 includes multiple subsystems: a file management subsystem 130, a network subsystem 132, a services 134, a virtual machine manager subsystem 136, drivers 138, an object manager 140, a security reference monitor 142, and a process manager 144. The file management subsystem 130 controls accesses to the storage devices, including floppy drives, CD-ROM drives, hard drives, etc. The network subsystem 132 controls the networking of a computer system to one or more other computer systems. A binding engine 133 within the network subsystem 132 controls the binding of various network drivers to one another in accordance with the multi-layered driver architecture, as discussed in more detail below. The services 134 provides control over hardware profiles for the operating system as well as additional "miscellaneous" operating system finctions. The virtual machine manager subsystem 136 controls task scheduling and virtual memory management. The drivers 138 interface between the operating system and the devices coupled to the computer system via the hardware abstraction layer (not shown), allowing specific devices to be accessed. The object manager 140 creates and controls operating system resources. The security reference monitor 142 monitors and restricts access to system resources by the applications 105. The process manager 144 creates and controls processes and threads executing in the system.

Figure 2:
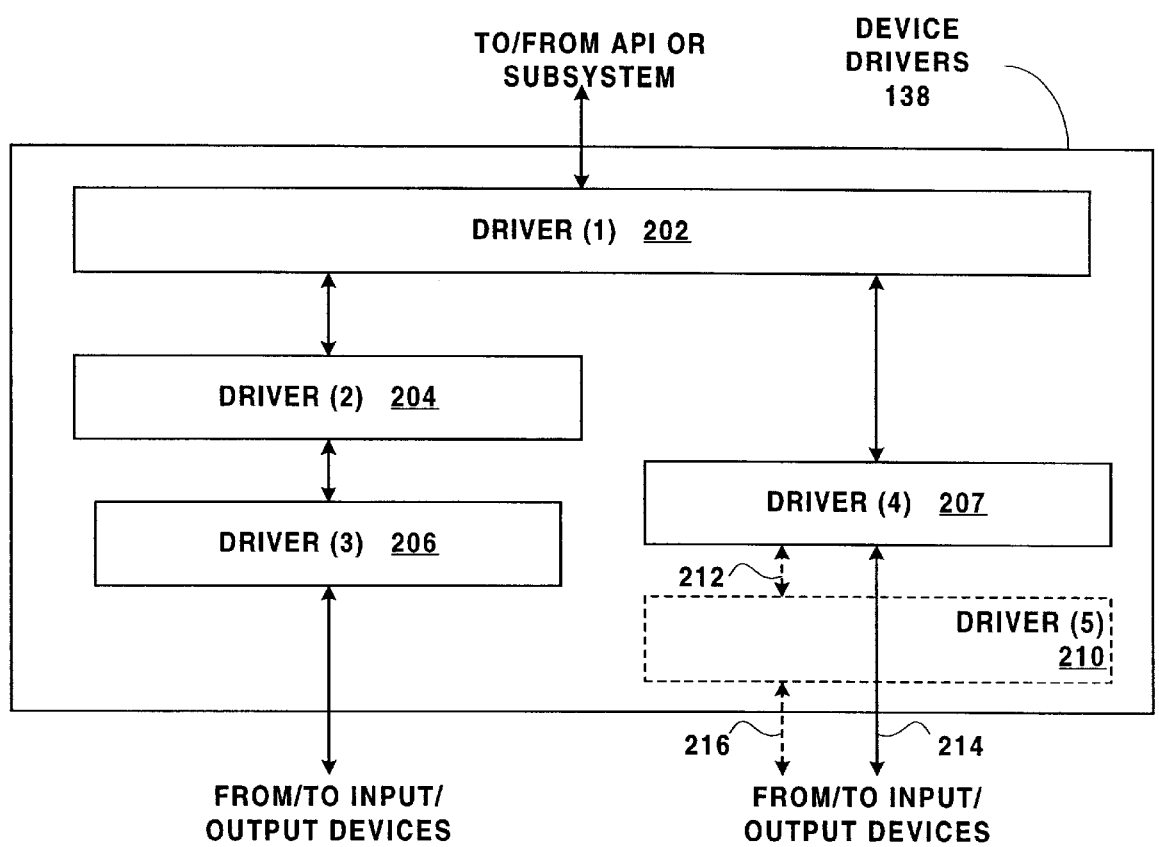
FIG. 2 is a block diagram illustrating the multi-layered driver architecture of an operating system such as may be used with one embodiment of the present invention.

FIG. 2 is a block diagram illustrating the multi-layered driver architecture of an operating system such as may be used with one embodiment of the present invention. Each of the drivers 138 provides an amount of control or management for accessing one or more of the I/O devices. The drivers 138 of FIG. 2 include four drivers 202, 204, 206, and 208. As illustrated, the drivers 138 provide communication between the Windows API layer 115 of FIG. 1 or another subsystem of operating system services 120 of FIG. 1 on one side and the I/O device(s) on the other side. Data and commands may need to pass through multiple drivers 202–208 when being transferred between an I/O device and the Windows API layer or another subsystem of the operating system. For example, data and/or commands may need to pass through drivers 202, 204, and 206 before being transmitted to a particular I/O device.

The drivers 138 operate together to provide an interface between the operating system and the devices of a computer system. In order for the operating system to communicate with a device, at least one driver typically needs to be added to the operating system in drivers 138 which indicates to the operating system how the device is to be communicated with. The drivers 138 include physical drivers which manage data and control information transfers between the operating system and the devices (e.g., driver 206), as well as additional "intermediate" drivers which provide additional services and functionality to the physical drivers (e.g., driver 202). It is to be appreciated that all the drivers for the operating system can be grouped together, as illustrated by drivers 138 of FIG. 1, or alternatively distributed throughout the operating system.

In order for an additional driver to be added into the drivers 138 of FIG. 2, the additional driver must be properly coupled to the other drivers. This process is referred to as "binding" the driver and is carried out by the binding engine 133 of FIG. 1. A driver can communicate directly with the other driver(s) to which it is bound. Driver 210 is an example of such an additional driver. An information file (not shown), such as a ".inf" file discussed above, corresponding to the driver 210 includes an indicator(s) of which other driver(s) the new driver 210 is to be bound to. By way of example, driver 210 may be bound to driver 208 as illustrated by connection 212, while the connection 214 to the I/O device is replaced by connection 216.

The drivers 202–210 are sometimes referred to as being "on top" of one another. Using this nomenclature, the "higher" a driver is the closer it is to directly communicating with the Windows API layer or another subsystem. Similarly, the "lower" a driver is the closer it is to directly communicating with an I/O device. By way of example, driver 202 is "higher" than or "above" driver 204, while driver 206 is "lower" than or "below" driver 204.

Figure 3:
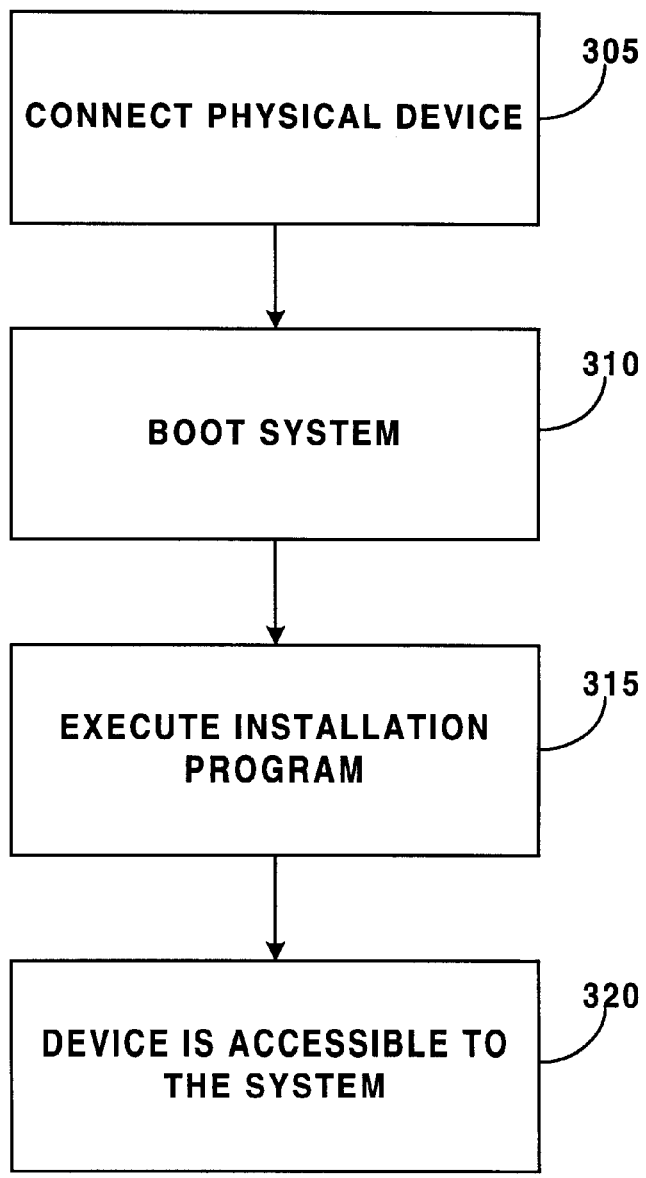
FIG. 3 is a block diagram illustrating the steps followed in adding a device to a computer system according to one embodiment of the present invention.

FIG. 3 is a block diagram illustrating the steps followed in adding a device to a computer system according to one embodiment of the present invention. The user first connects the physical device to the system, step 305. This connection comprises, for example, plugging the appropriate cable into the system or plugging a board into the appropriate slot. It should be noted that typically the physical installation of new devices, particularly new boards within the system, is performed while the computer system is powered off.

The user then boots the system, step 310. Booting and re-booting of a computer system both refer to starting or re-starting of the computer system. During the boot process, the operating system is loaded into the system RAM from a nonvolatile storage device, such as a hard drive. Upon successful loading of the operating system, additional applications can be executed. The boot process can be either a cold-boot, which refers to the powering on of a computer system, or a warm-boot, which refers to the resetting of the computer system while the computer system is powered. A warm-boot can result from either a hardware reset (e.g., activation of a "reset" button on the computer system) or a software reset (e.g., a "reset" signal being sent to the operating system).

Upon successfully booting the system an installation program, also referred to as a setup program, is executed, step 315. The installation program typically accompanies the device and is located on one or more disks (floppy disks, CD-ROMs, etc.). Alternatively, the installation program may be accessed remotely, such as via a network. The installation program follows various device-dependent steps to allow the operating system to use the device and to provide information about the device to the user, including the transfer of at least a physical device driver to the system from the one or more installation disks. Additionally, it should be noted that the installation program can be executed by the user, such as by selecting a "setup.exe" program for execution, or alternatively may be started automatically by the operating system after the system boot in step 310 completes.

Upon completion of the installation program in step 315, the newly added device is accessible to the system, step 320, using the newly installed driver(s). As illustrated in FIG. 3, the device is accessible without requiring the re-booting of the system between steps 315 and 320. In contrast, typical prior art systems would require that the system be re-booted between steps 315 and 320.

Figure 4:
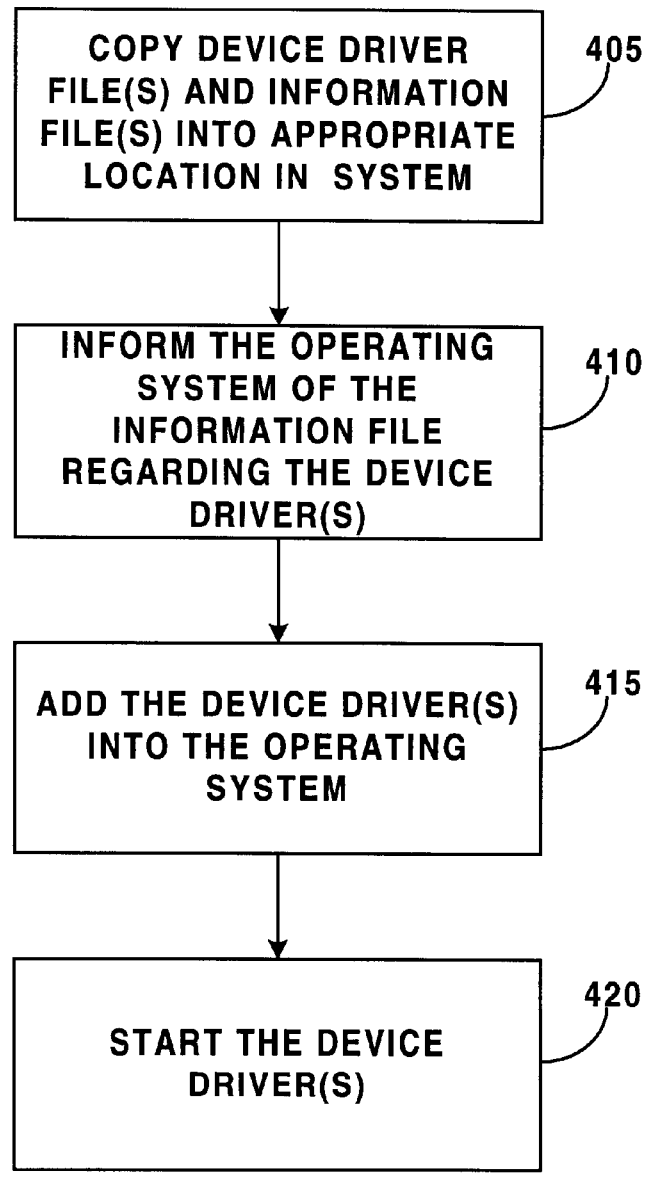
FIG. 4 is a flowchart illustrating the steps followed in installing a driver for a device according to one embodiment of the present invention.

FIG. 4 is a flowchart illustrating the steps followed in installing a driver for a device according to one embodiment of the present invention. In the illustrated embodiment, the steps of FIG. 4 are carried out by the installation program being executed in step 315 of FIG. 3.

The installation routine first copies the driver file(s) corresponding to the device into the appropriate location in the computer system, step 405. In the illustrated embodiment, this appropriate location is a particular directory where the operating system expects drivers to be located. It is to be appreciated that one or more driver files may correspond to a particular device. In the illustrated embodiment, the driver file(s) include the driver code which is executed by the computer system.

The installation routine then informs the operating system of the information file, step 410. The information file provides information to the operating system regarding the driver. In embodiments where the operating system does not use such an information file, the present invention proceeds directly from step 405 to step 415, skipping step 410. The installation routine then adds the driver(s) into the operating system, step 415. After adding the driver(s) into the operating system, the installation routine starts the driver(s), step 420. At this point the operating system includes the driver, which is running, for the new device. Thus, the device is now useable by the operating system without having required the computer system to be re-booted.

In the illustrated embodiment, the installation routine implements the copying of the driver file and information file (step 405) by copying the files to a particular directory on a particular disk drive of the computer system. In one implementation, the disk drive to which the files are copied is the disk drive on which the operating system program is stored. Additionally, in one implementation, the directory to which the files are copied is the "\system32\drivers" directory under the Windows operating system directory (which is typically identified when the operating system is installed).

In the illustrated embodiment, the installation routine implements informing the operating system of the information file (step 410) by executing a system call to the binding engine 133 of FIG. 1 of the operating system. The information file is a ".inf" file which, in one implementation, is written in an operating system-specific language, such as Microsoft's Graphical User Interface (GUI) INF Script Language. The ".inf" file indicates to the operating system how the corresponding driver should be bound to other drivers within the operating system. Additionally, the ".inf" file also provides various descriptive information regarding the drivers which is incorporated into the Windows NT registry by the operating system. In one implementation, this system call is the "NetSetupComponentInstall" system call of the Windows NT v4.0 operating system. The parameters for the NetSetupComponentInstall system call are shown in Table I below. It should be noted that although a value may be returned (pdwReturn) indicating that a re-boot is required, the present invention does not re-boot the system.

TABLE I

| Parameter | Description |
|---|---|
| hwndParent | A handle of the window running when the NetSetupComponentInstall system call is made. In one implementation, a handle of the window in which the installation routine is executing. |
| pszInfOption | Information file options which can be selected. In one implementation is set to "PTI" |
| pszInfName | Name of the information file being installed. |

TABLE I-continued

| Parameter | Description |
| --- | --- |
| pszInstallPath | A path indicating where the information file being installed can be found. |
| p1szInfSymbols | Indicator of information file symbols. In one implementation is set to NULL. |
| dwInstallFlags | Installation flags which can be selected. In one implementation is set to "INFINSTALL_INPROCINTERP". |
| pdwReturn | A return value indicating the status of the install. In one implementation, encoded onto six possible return values. A value of 0 indicates both bindings review and re-boot is required. The values 1, 2, or 3 are currently undefined. A value of 4 indicates bindings review is required. A value of 5 indicates a re-boot is required. |

In the illustrated embodiment, the installation routine implements the adding of the driver into the operating system (step 415) by executing a system call to the binding engine 133 of FIG. 1 of the operating system. In one implementation the system call is the "NetSetupReview-Bindings" system call of the Windows NT v4.0 operating system. The parameters for the NetSetupReviewBindings system call are shown in Table II below.

TABLE II

| Parameter | Description |
| --- | --- |
| hwndParent | A handle of the window running when the NetSetupReviewBindings system call is made. In one implementation, a handle of the window in which the installation routine is executing. |
| dwBindFlags | Binding flags which can be selected. In one implementation is set to zero. |

In the illustrated embodiment, the installation routine implements the starting of the driver (step 420) by executing system calls to the operating system. In one implementation, these system calls are the "CreateService" system call and the "StartService" call of the Windows NT™ v4.0 operating system. The CreateService system call creates a new service entry within a service control manager of the operating system for the driver, and the StartService call runs the driver. The parameters for the CreateService call are shown in Table III below and the parameters for the StartService call are shown in Table IV below.

TABLE III

| Parameter | Description |
| --- | --- |
| scHandle | A handle of the service control manager. In one implementation is the handle to the service control manager database. |
| nameService | Name of the service being created. |
| nameDisplay | Name of the service to be displayed. |
| access | The desired access level. In one implementation is set to SERVICE_ALL_ACCESS. |
| serviceType | The service type. In one implementation is set to SERVICE_KERNEL_DRIVER. |
| startType | The start type. In one implementation is set to SERVICE_DEMAND_START. |
| errorType | The error control type. In one implementation is set to SERVICE_ERROR_NORMAL. |
| path | The location of the service's binary code. |
| ordering | Identification of a load ordering group, if any. In one implementation is set to NULL. |
| tag | Identification of a tag for the driver, if any. In one implementation is set to NULL. |

TABLE III-continued

| Parameter | Description |
| --- | --- |
| dependencies | Identification of dependencies of the driver, if any. In one implementation is set to NULL. |
| localSystem | Identification of the local system, if any. In one implementation is set to NULL. |
| password | Identification of a password, if any. In one implementation is set to NULL. |

TABLE IV

| Parameter | Description |
| --- | --- |
| serviceHandle | An identifier of the service to be started. |
| numArguments | The number of arguments for starting the service. In one implementation is set to zero. |
| arguments | A pointer to the arguments. In one implementation is set to NULL. |

The steps of the present invention allow drivers to be installed and used by the operating system without requiring the computer system to be re-started. New drivers are bound to other drivers within the operating system without taking any steps to re-boot or re-start the computer system. It is to be appreciated that typically the physical installation of new devices, particularly new boards within the system, is performed while the computer system is powered off. However, the installation or setup program which adds the driver(s) to the computer system can be executed in accordance with the present invention without requiring a system re-start or re-boot.

Also in the discussions above, reference is made to specific system calls to the network binding engine. It is to be appreciated that alternate embodiments, in which devices other than network devices can be installed, can utilize analogous binding engines of other subsystems. In other alternate embodiments, a single binding engine may be used for multiple subsystems of FIG. 1 rather than separate binding engines.

Figure 5:
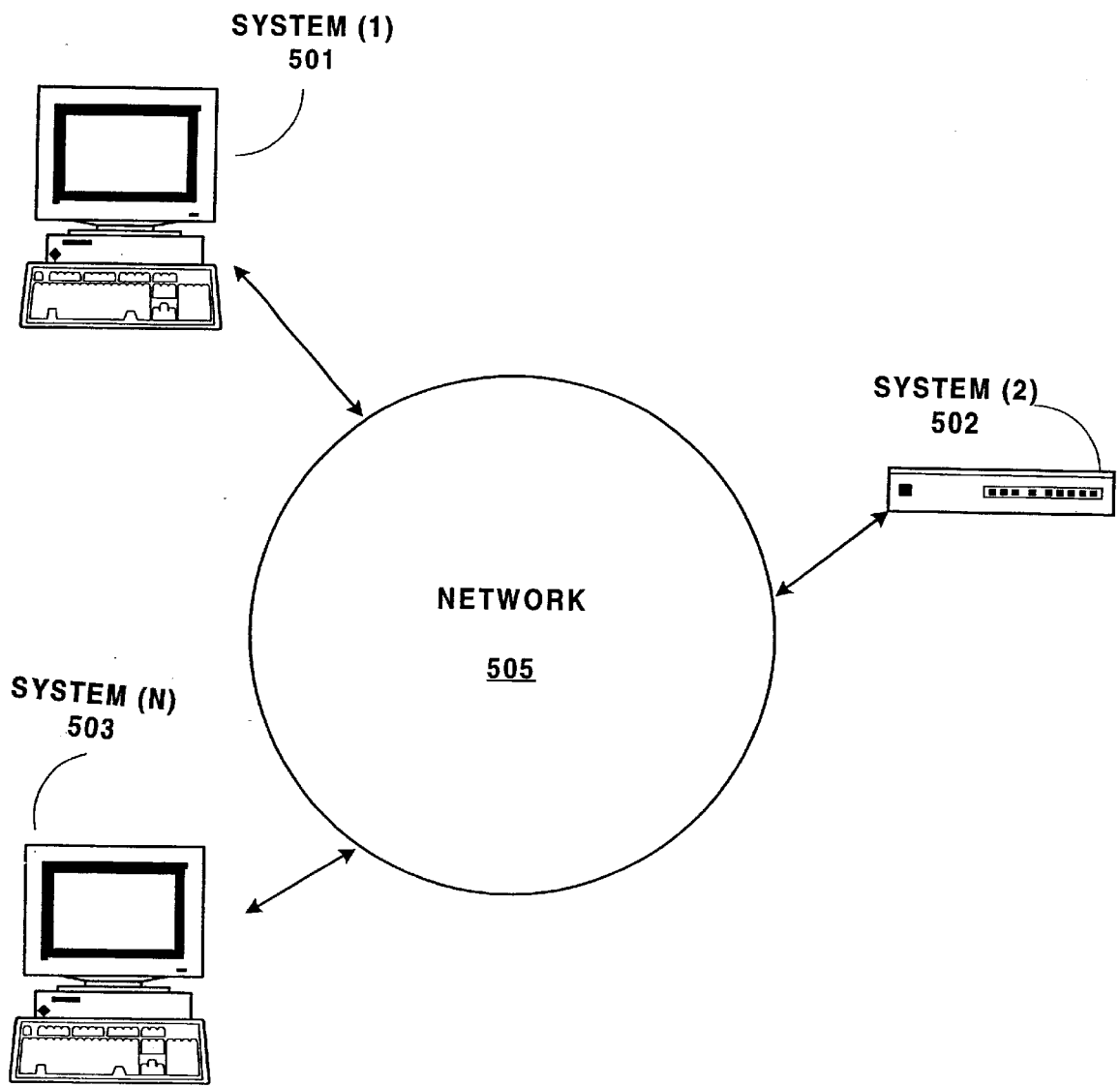
FIG. 5 illustrates a networked environment in which one embodiment of the present invention can be used.

FIG. 5 illustrates a networked environment in which one embodiment of the present invention can be used. A total of n different systems 501, 502 and 503 are illustrated in the network environment 500 of FIG. 5. Systems 501, 502 and 503 may be similar or different hardware systems coupled to a network. Examples of such systems include general purpose desktop computer systems, server systems, gateways, etc. The systems 501–503 are coupled together via a network 505. Network 505 can be any of a wide variety of conventional networks, such as a local area network (LAN) or a wide area network (WAN), of any of a wide variety of conventional types, such as an Ethernet or Token Ring network. Network 505 conforms to any of a wide variety of conventional networking protocols, such as the Windows 95™, Windows NT™, or Novell Netware networking protocols. Additionally, the network 505 as illustrated may also include multiple networks, such as the Internet.

According to one embodiment of the present invention, the systems 501 and 503 are both general purpose computer systems, and the system 502 is an Instant Internet™ device available from Bay Networks Inc., of Santa Clara, Calif.

Installation or setup programs can be executed for new devices added either locally to a system or remotely. By way of example, a device can be added to the system 501 and an installation program executed locally by system 501 to allow the system 501 to communicate with the new device. By way of another example, a new device could be added to the network 505, such as when system 502 is initially coupled to the network 505, and an installation program executed locally by system 501 to allow the system 501 to communicate with the newly added system 502.

Figure 6:
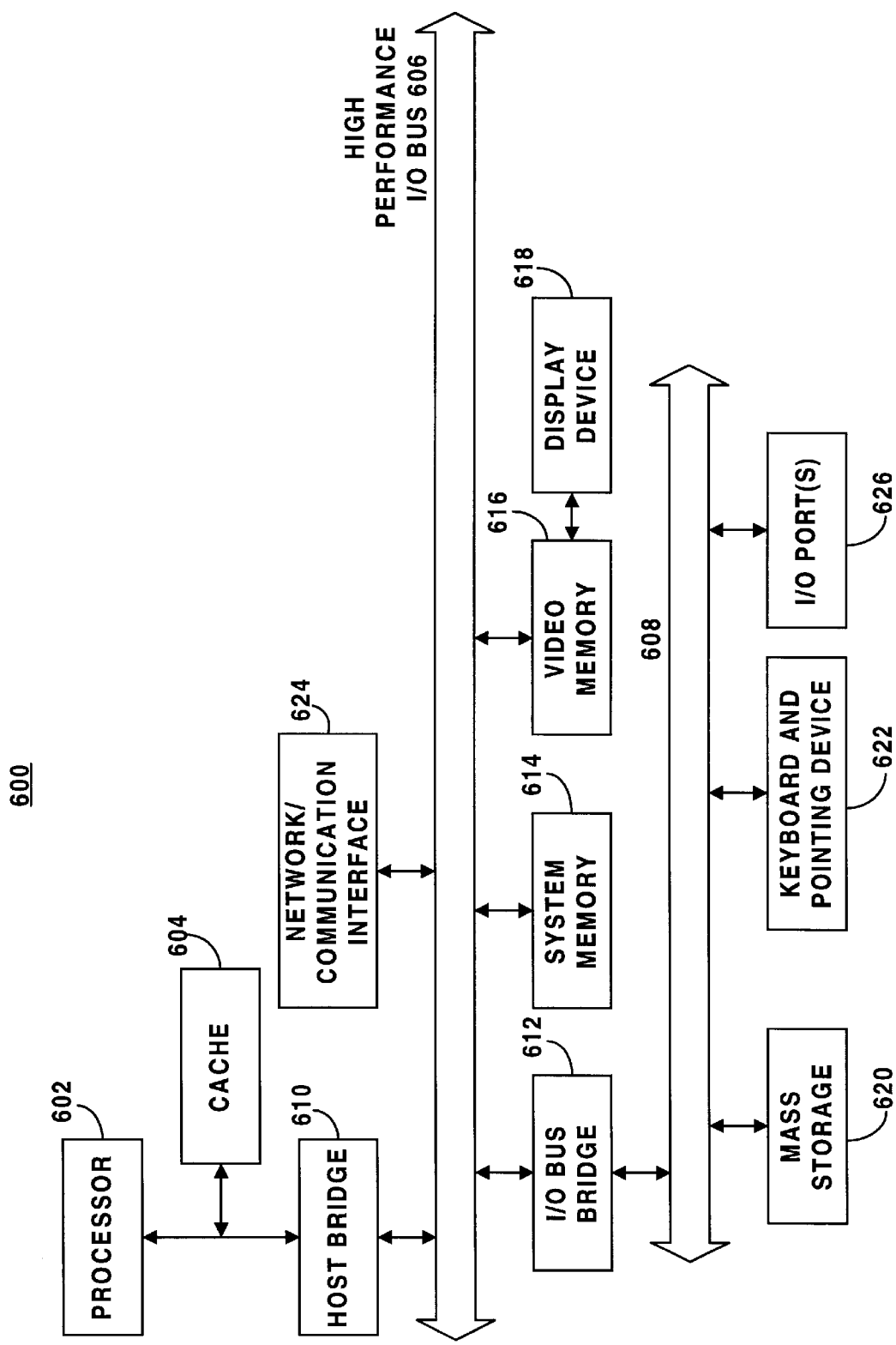
FIG. 6 illustrates a hardware system or machine on which one embodiment of the present invention can be practiced.

FIG. 6 illustrates a hardware system or machine on which one embodiment of the present invention can be practiced. In one embodiment, the system architecture 100 illustrated in FIG. 1 is implemented on a hardware system of FIG. 6. In the illustrated embodiment, hardware system 600 includes processor 602 and cache memory 604 coupled to each other as shown. Additionally, hardware system 600 includes high performance input/output (I/O) bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624, system memory 614, and video memory 616. In turn, display device 618 is coupled to video memory 616. Coupled to bus 608 is mass storage 620, keyboard and pointing device 622, and I/O ports 626. Collectively, these elements are intended to represent a broad category of hardware systems, including but not limited to general purpose computer systems based on processors available from Intel Corporation of Santa Clara, Calif., from Advance Micro Devices (AMD) of Sunnyvale, Calif., from National Semiconductor of Sunnyvale, Calif., from Digital Equipment Corporation (DEC) of Maynard, Mass., or from Motorola, Inc. of Schaumburg, Ill.

These elements 602–626 perform their conventional functions known in the art. In particular, network/communication interface 624 is used to provide communication between system 600 and any of a wide range of conventional networks, such as an Ethernet, token ring, the Internet, etc. It is to be appreciated that the circuitry of interface 624 is dependent on the type of network the system 600 is being coupled to. In one implementation, hardware system 600 is coupled to network 505 of FIG. 5 via network/communication interface 624.

Mass storage 620 is used to provide permanent storage for the data and programming instructions to perform the above described functions of installing device drivers of FIG. 4, whereas system memory 614 is used to provide temporary storage for the data and programming instructions when executed by processor 602. I/O ports 626 are one or more serial and/or parallel communication ports used to provide communication between additional peripheral devices which may be coupled to hardware system 600.

It is to be appreciated that various components of hardware system 600 may be re-arranged. For example, cache 604 may be on-chip with processor 602. Alternatively, cache 604 and processor 602 may be packaged together as a "processor module" and attached to a "processor card", with processor 602 being referred to as the "processor core". Furthermore, certain implementations of the present invention may not require nor include all of the above components. For example, mass storage 620, keyboard and pointing device 622, and/or display device 618 and video memory 616 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, storage devices, or memories.

In alternate embodiments of the present invention, hardware system 600 is less complex than illustrated. By way of example, processor 602, system memory 614, and network/communication interface 624 could be implemented in a microcontroller or an application specific integrated circuit (ASIC).

In one embodiment, the method of FIG. 4 is implemented as a series of software routines run by a hardware system of FIG. 6. These software routines comprise a plurality or series of instructions to be executed by a processor in a hardware system, such as processor 602 of FIG. 6. Initially, the series of instructions are stored on a storage device, such as mass storage 620. It is to be appreciated that the series of instructions can be stored on any conventional storage medium, such as a diskette, CD-ROM, magnetic tape, DVD, laser disk, ROM, etc. It is also to be appreciated that the series of instructions need not be stored locally, and could be received from a remote storage device, such as a server on a network, via network/communication interface 624.

The instructions are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages.

In alternate embodiments, the present invention is implemented in discrete hardware or firmware. For example, in one alternate embodiment, an ASIC is programmed with the above described functions of the present invention.

Figure 7:
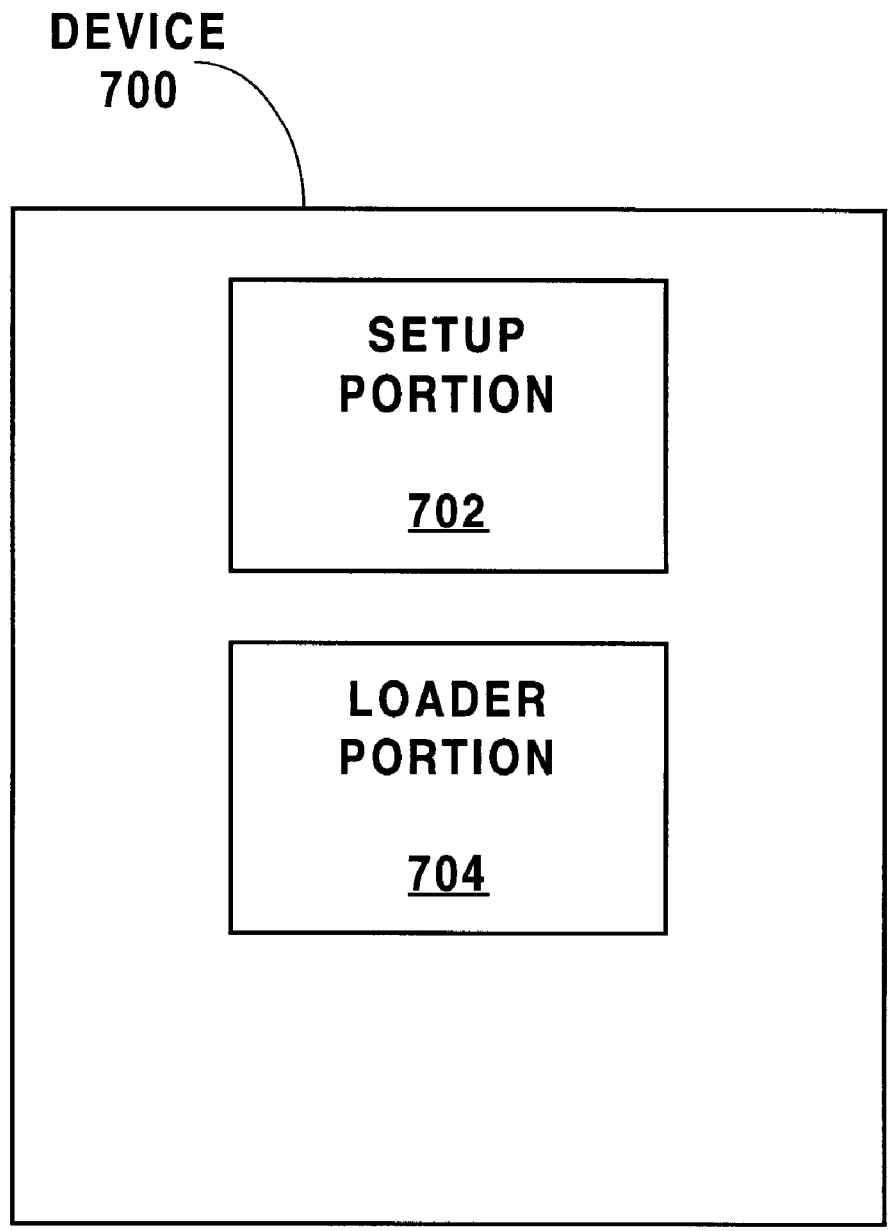
FIG. 7 is a block diagram illustrating a device on which one embodiment of the present invention is implemented.

FIG. 7 is a block diagram illustrating a device on which one embodiment of the present invention is implemented. The device 700 is meant to represent a wide variety of devices in which the present invention can be implemented, including conventional storage media (such as a floppy disk or a random access memory), as well as discrete hardware or firmware.

The device 700 includes a setup portion 702 and a loader portion 704. In embodiments where the present invention is implemented in software or firmware, setup portion 702 includes the instructions, to be executed by a processor, for carrying out the copying, informing and adding steps 405, 410, and 415 of FIG. 4, whereas loader portion 704 includes the instructions, to be executed by a processor, for carrying out the starting step 420 of FIG. 4. In embodiments where the present invention is implemented in hardware, setup portion 702 includes the logic for carrying out the copying, informing and adding steps 405, 410, and 415 of FIG. 4, whereas loader portion 704 includes the logic for carrying out the starting step 420 of FIG. 4.

In the discussions above, various references are made to implementation details, such as particular operating system calls, specific to the Windows NT™ v4.0 operating system. In alternate embodiments, these implementation details are different and are based on the particular operating system(s) with which the present invention is practiced.

Also in the discussions above, reference is made to installing new drivers when adding new devices to a particular system. In alternate embodiments, drivers can be installed in a system without having added a new device. Examples of such alternate embodiments where a device has previously been added to a system include installing an updated version of a driver, installing a replacement driver, re-installing a previously installed driver (e.g., if a particular driver became corrupted), installing an additional driver which provides additional functions or features, etc.

In the discussions above, reference is made to particular components or apparatus being coupled together. As used herein, coupled is meant to include both a direct connection as well as an indirect connection. By way of example, additional apparatus and media can be situated between two components which are coupled together.

Thus, a method and apparatus for installing drivers without requiring system re-boot has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for installing a driver into an operating system of a hardware system, wherein the operating system includes a multi-layered driver architecture, comprising, in the sequence set forth:

copying a driver file corresponding to a device and a corresponding information file from an installation source, wherein the information file includes one or more indicators of at least one other driver to which the driver is to be bound;

executing a NetSetupComponentInstall operating system call to access a binding engine of the operating system and inform the operating system of the information file;

adding the driver to the operating system; and starting the driver without re-booting the hardware system.

2. The method of claim 1, wherein starting the driver comprises:

executing a CreateService operating system call; and executing a StartService operating system call.

3. The method of claim 1, wherein the device comprises a network adapter card.

4. A computer-readable medium having stored thereon a plurality of instructions for installing a driver into an operating system of a hardware system, wherein the operating system includes a multi-layered driver architecture, which when executed by a processor, causes the processor to perform operations comprising:

copying a driver file corresponding to a device and a corresponding information file from an installation source, wherein the information file includes one or more indicators of at least one other driver to which the driver is to be bound;

executing a NetSetupComponentInstall operating system call to access a binding engine of the operating system and inform the operating system of the information file;

adding the driver to the ocerating system; and starting the driver without re-booting the hardware system.

5. The computer-readable medium of claim 4, the plurality of instructions for implementing a function for starting the driver comprise one or more instructions for executing a CreateService operating system call and for executing a StartService operating system call.

6. The computer-readable medium of claim 4, wherein the device comprises a network adapter card.

7. An apparatus for installing a driver into an operating system of a hardware system, wherein the operating system includes a multi-layered driver architecture, comprising:

first logic to copy a driver file corresponding to a device and a corresponding information file from an installation source, wherein the information file includes one or more indicators of at least one other driver to which the driver is to be bound;

second logic to execute a NetSetupComponentInstall operating system call to access a binding engine of the operating system and inform the operating system of the information file;

third logic to add the driver to the operating system; and fourth logic to start the driver without re-booting the hardware system.

8. The apparatus of claim 7, wherein the device comprises a network adapter card.

9. An apparatus for installing a driver into an operating system of a hardware system, wherein the operating system includes a multi-layered driver architecture, comprising:

means for copying a driver file corresponding to a device and a corresponding information file from an installation source, wherein the information file includes one or more indicators of at least one other driver to which the driver is to be bound;

means for executing a NetSetupComponentInstall operating system call to access a binding engine of the operating system and inform the operating system of the information file;

means for adding the driver to the operating system; and means for starting the driver without re-booting the hardware system.

10. The apparatus of claim 9, wherein the device comprises a network adapter card.

11. The method of claim 1, wherein the operating system is Windows NT.

12. The method of claim 4, wherein the operating system is Windows NT.

13. A method for installing a driver into an operating system of a hardware system, wherein the operating system includes a multi-layered driver architecture, comprising, in the sequence set forth:

copying a driver file corresponding to a device and a corresponding information file from an installation source, wherein the information file includes one or more indicators of at least one other driver to which the driver is to be bound;

a informing the operating system of the information file to identify the at least one other driver to which the driver is to be bound;

executing a NetSetupReviewBindings operating system call to add the driver to the operating system; and starting the driver without re-booting the hardware system.

14. The method of claim 13, wherein starting the driver comprises:

executing a CreateService operating system call; and executing a StartService operating system call.

15. The method of claim 13, wherein the device comprises a network adapter card.

16. A computer-readable medium having stored thereon a plurality of instructions for installing a driver into an operating system of a hardware system, wherein the operating system includes a multi-layered driver architecture, which when executed by a processor, causes the processor to perform operations comprising:

copying a driver file corresponding to a device and a corresponding information file from an installation source, wherein the information file includes one or more indicators of at least one other driver to which the driver is to be bound;

informing the operating system of the information file to identify the at least one other driver to which the driver is to be bound;

executing a NetSetupReviewBindings operating system call to add the driver to the operating system; and starting the driver without re-booting the hardware system.

17. The computer-readable medium of claim 16, wherein the plurality of instructions for starting the driver, further comprises:

executing a CreateService operating system call; and executing a StartService operating system call.

18. An apparatus for installing a driver into an operating system of a hardware system, wherein the operating system includes a multi-layered driver architecture, comprising:

first logic to copy a driver file corresponding to a device and a corresponding information file from an installation source, wherein the information file includes one or more indicators of at least one other driver to which the driver is to be bound;

second logic to inform the operating system of the information file to identify the at least one other driver to which the driver is to be bound;

third logic to execute a NetSetupReviewBindings operating system call to add the driver to the operating system; and fourth logic to start the driver without re-booting the hardware system.

19. The method of claim 18, wherein the fourth logic to start the driver further comprises:

logic to execute a CreateService operating system call; and logic to execute a StartService operating system call.

20. An apparatus for installing a driver into an operating system of a hardware system, wherein the operating system includes a multi-layered driver architecture, comprising:

means for copying a driver file corresponding to a device and a corresponding information file from an installation source, wherein the information file includes one or more indicators of at least one other driver to which the driver is to be bound;

means for informing the operating system of the information file to identify the at least one other driver to which the driver is to be bound;

means for executing a NetSetupReviewBindings operating system call to add the driver to the operating system;

means for adding the driver to the operating system; and means for starting the driver without re-booting the hardware system.

21. The apparatus of claim 20, wherein the means for starting the driver, further comprises:

means for executing a CreateService operating system call; and means for executing a StartService operating system call.

* * * * *